United States Patent [19]
Kochanneck

[11] Patent Number: 5,852,353
[45] Date of Patent: Dec. 22, 1998

[54] MULTIBLOCK ROBOT SYSTEM

[75] Inventor: Uwe Kochanneck, Im Spähenfelde 25, D-44145 Dortmund, Germany

[73] Assignee: Uwe Kochanneck, Dortmund, Germany

[21] Appl. No.: 844,374

[22] Filed: Apr. 18, 1997

[30] Foreign Application Priority Data

Apr. 22, 1996 [DE] Germany .................. 196 15 943.1

[51] Int. Cl.⁶ .................. F03D 11/04; H02N 6/00
[52] U.S. Cl. .................. 318/558; 136/206; 60/698; 290/1 R
[58] Field of Search .................. 318/558; 290/1 R, 290/55; 136/200, 205, 206, 243, 244; 60/698

[56] References Cited

U.S. PATENT DOCUMENTS

| | | | |
|---|---|---|---|
| 4,006,925 | 2/1977 | Scherer | 290/55 |
| 4,182,960 | 1/1980 | Reuyl | 290/1 R |
| 4,235,221 | 11/1980 | Murphy . | |
| 4,776,171 | 10/1988 | Perry, Jr. et al. . | |
| 5,187,423 | 2/1993 | Marton | 320/2 |
| 5,241,875 | 9/1993 | Kochanneck | 74/479 BP |
| 5,691,980 | 11/1997 | Welles, II et al. | 370/316 |
| 5,692,647 | 12/1997 | Brodie | 222/173 |

*Primary Examiner*—Bentsu Ro

[57] ABSTRACT

A multiblock robot system for the economical energy generation from sun and wind power, the energy storage and for the energy disposition and delivery, composed of plug connected and optional combinations of multiblock standard parts, having socket flange booster chambers with integrated units as, solar, wind rotor, control computer, checkcard reader, remote control antenna, illuminator and battery units. Rotation flange plug connections rotate the integrated units with solar surfaces and the wind rotor blades always to the optimal, perpendicular position of the sun and wind directions. The battery units are plug connected one behind the other to battery lines for the energy storage, composing checkcard controlled battery dispensers and battery changers for the self operating battery exchange and fully automatic delivery to multiblock robots, electro cars and to the public mains.

6 Claims, 9 Drawing Sheets

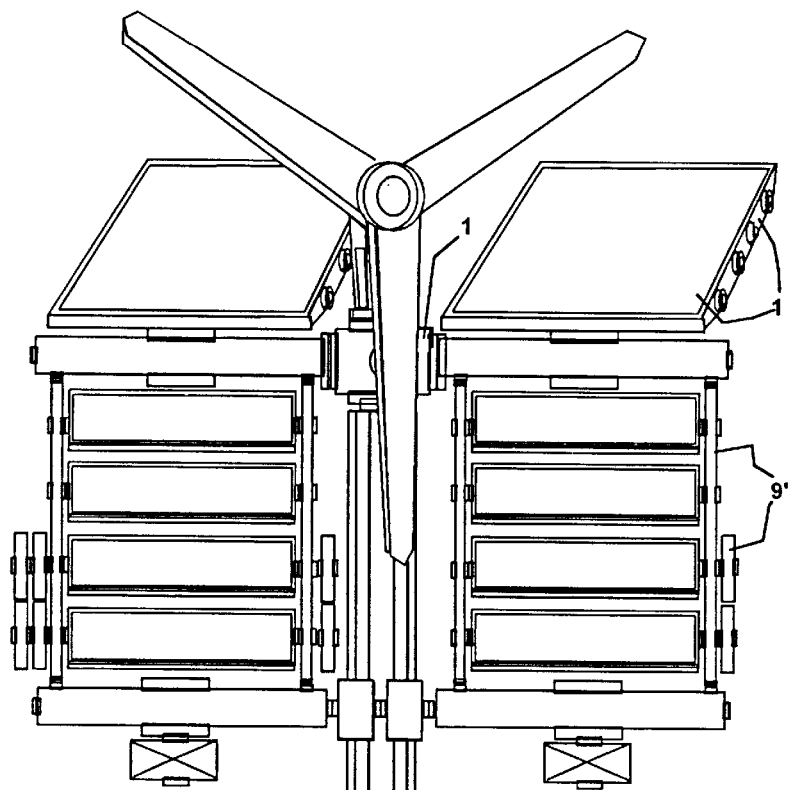
FIG. 4
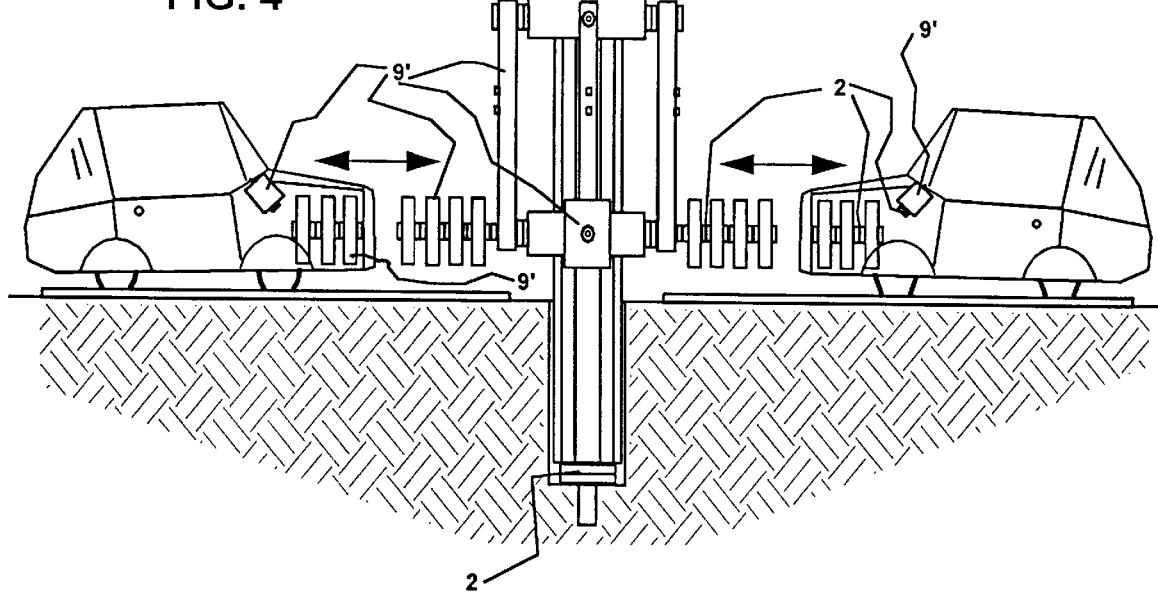

MULTIBLOCK ROBOT SYSTEM

BACKGROUND OF THE INVENTION

1. Field of the Invention

This application relates to a multiblock robot system for the energy generation from sun and wind power, the energy storage and for the energy disposition and delivery.

For the generation of power from sun and wind, such as by present day sun and wind energy systems, it is common practice to achieve the desired energy transformation by means of individual, expanded sun collector areas and special wind rotor installations, which have a relative low standardisation degree and a modest efficiency in relation to the needed area for the installation. These special energy installations have to be mounted by field specialist. The power preparation, storage and economical distribution is not very attractive for consumers.

2. Description of the Prior Art

It is well known, as illustrated in U.S. Pat. No. 5,241,875, issued on Sep. 7, 1993, to provide a multiblock robot system with the advantage, that total robot systems can be restructured with only a few handling operations to the most different robot system solutions, by means of multiblock standard parts which are all of nearly the similar design. As disclosed in U.S. application Ser. No. 07/986/532 Filed Dec. 7, 1992 and Ser. No. 08/645/423, Filing/Receipt Date of May 13, 1996, standardisation and functionality of multiblock robot systems have been furthermore extended by means of multiblock standard parts with driving and generator abilities and with booster; chambers, the construction dimensions have been even more reduced, such, that the application flexibility and the spectrum of standard parts compatible multiblock robotic systems can be further expanded.

SUMMARY OF THE INVENTION

It is an object of the present invention to increase further the advantages of economical manufacturing, functionality, the spectrum of operations and the application flexibility of these multiaxis robot systems by introducing a small number of additional multiblock robot standard parts, for economical and environmentally beneficial, small installation-area energy generation systems, for the availability and services of other multiblock robot systems, multiblock electro street cars, and the public mains, thus, raising further the number of pieces of all, one to the other compatible multiblock robot standard parts. In the accomplishment of the foregoing object, it is another important object of the invention, to provide a multiblock robot energy system constructed so that also users without technical knowledge can handle the speedy plug installations for an immediate energy output and, that the far-reaching system flexibility allows the energy generation and disposition under changed, seasonal weather conditions, thus, being a $CO_2$ free energy system with a continuously high energy efficiency, by means of changeable and, at any time rapidly adaptable multiblock standard part combinations.

These objects are attained by the optional combination of plug connected multiblock standard parts, having socket flange booster chambers with integrated solar units and socket flanges for plug connection with central chambers, having built in equipment of the solar electronic and voltage transformers and, rotation flange plug connections on the outer edges and on the back side. The multiblock standard parts are combined with solar units, articulated frames, socket flange booster chambers with central and vertical support function, horizontal junction socket flange booster chambers, multiblock-articulated frames which are horizontally and vertically plug connected and composed of socket flange booster chambers with socket flanges. The combination option further comprises socket flange booster chambers with integrated battery units, which, plug connected one behind the other, compose battery lines with self locking solenoid switches in the rotation flange plug connections for self operating locking and unlocking of battery units during a battery exchange, the battery lines as such composing multiblock-battery dispensers and multiblock-battery changers with a multitude of battery lines. The combination option further comprises socket flange booster chambers with integrated illuminators, with integrated wind rotors having a horizontal and vertical rotation axis, with integrated control computer unit and socket flange booster chambers with integrated sensor and control electronic. These most different combinations and plug connection options from one rotation flange plug connection to the other, of single or multiple multiblock components, provide a variety of autonomous, self operating multiblock energy stations for solar and wind energy generation, energy storage, energy disposition and delivery, which are able to rotate the solar surfaces and the wind rotor blades always to the perpendicular position of the sun and wind directions.

This arrangement is a considerable improvement over the prior-art systems, that by the extension of multiblock-multiaxis systems to the very important field of energy generation, the variety, functionality and economical manufacturing of multiblock robots and other multi-axis systems is furthermore improved. Additionally, this development provides an energy generation and supply system for outside operating multiblock robots and all other multiblock-multiaxis systems with highest efficiency and reduced need of installation-areas which can be disposed at optional places by users without technical experiences and also by self operating multiblock robots, easily installed and changeable to the most variable sizes by means of simple plug connection operations, and which can be used everywhere as small energy stations from single users and from self operating robots, as medium-sized energy station for different users of electrocars, also installed at street borders and conventional petrol stations and, as compound systems, combined to a big and powerful, $CO_2$ reducing network for energy-generation and energy supply, also supporting the public mains.

The novel features and advantages which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a front view of a stationary multiblock energy station for combined solar and wind energy generation, energy storage and energy delivery, having an enhanced performance capacity in comparison with the stationary energy station shown in FIG. 3 and comprising a self operating battery changer;

DETAILED DESCRIPTION

Figure 1:
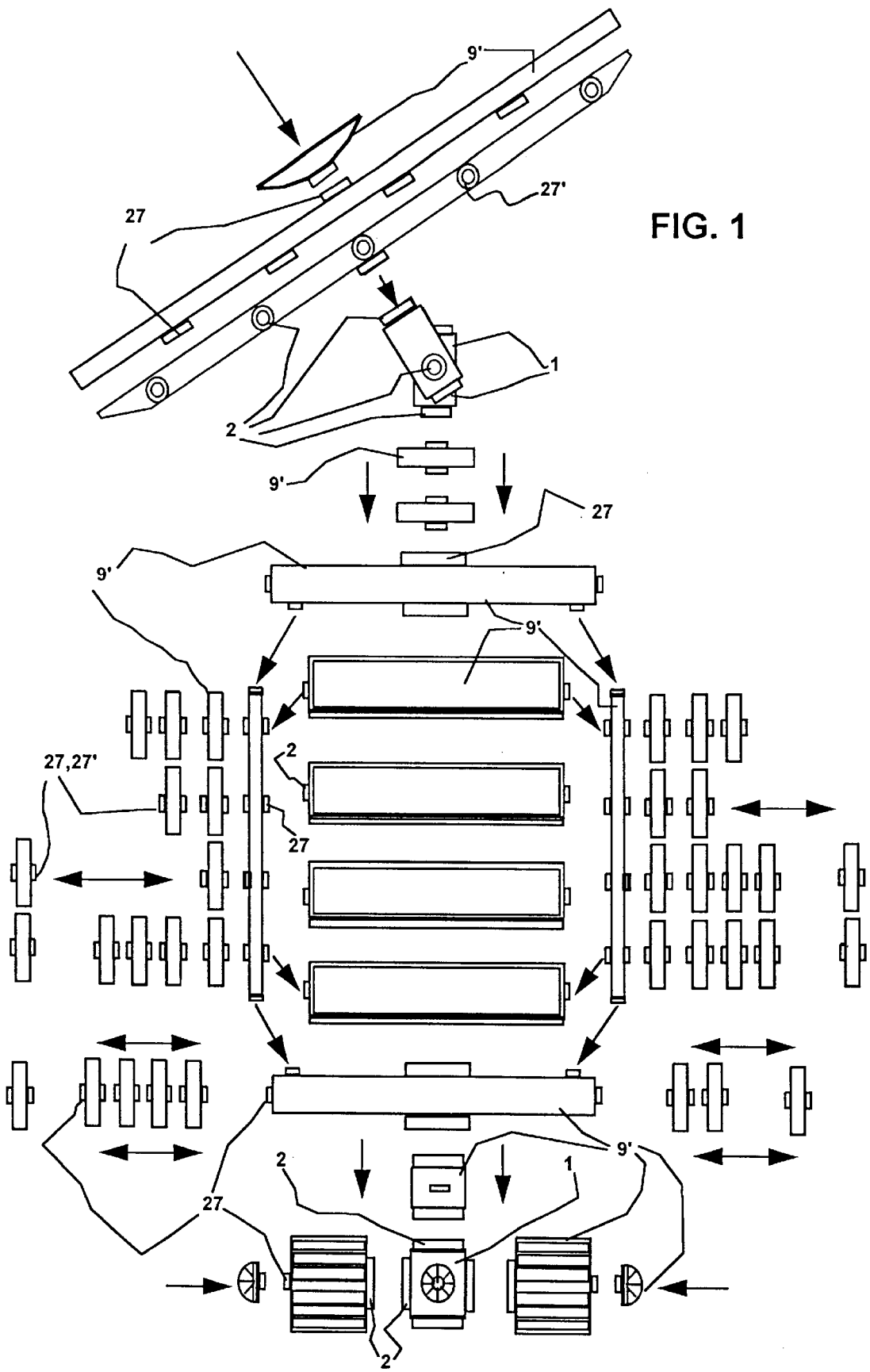
FIG. 1 is a front view of a multiblock robot system illustrating a typical mobile multiblock robot energy station with solar energy generation, energy storage and energy delivery ability, having a medium performance capacity, parts shown in the state to be plug connected in direction of the arrows to reveal details of the multiblock combinations.

A mobile multiblock robot system in one of its possible configurations and combinations persuant to the principles of this invention is broadly designated in FIG. 1. Each multiblock robot system which comprises the mobile multiblock robot energy station for combined solar and wind energy generation, energy storage and energy delivery, having a medium performance capacity, is a self operating, location independent energy support point. The driving ability is obtained by means of multiblock standard parts 1 having socket flange booster chambers 9' with integrated belt driving units or optionally with wheel driving units, which comprise image recognition, movement and infrared control sensor units, which are plug connected with the outer rotation flange plug connections 2 and with the multiblock standard part 1, provided in center position. Above the multiblock standard part 1 in center position of the belt driving units is plug connected a socket flange booster chamber 9' with an integrated control computer unit. Furthermore, receives this multiblock standard part 1 a multiblock-articulated frame which is plug connected by means of two identical, vertical socket flange booster chambers 9' and which is freely rotatable about the own vertical axis by the driving windings of the multiblock standard parts 1 in center position. The present mobile robot energy station comprises four multiblock standard parts 1 with socket flange booster chambers 9' with integrated solar units, which with socket flanges 27 are plug connected to the cavity seat face of the socket flanges 27' of the central chambers 9 and as such, compose in the plug connected state a multiblock standard part 1. On the rotation flange plug connections 27, on the side of the vertical socket flange booster chambers 9', are provided horizontally plug connected socket flange booster chambers 9' with integrated battery units. The central rotation flange plug connection 27 of the multiblock-articulated frame receives two, vertically plug connected socket flange booster chambers 9' with integrated battery units. Above these, illustrated in a rotated side view, is provided and plug connected an articulated arm which is composed of two plug connected multiblock standard parts 1 and which receives a freely rotatable multiblock standard part 1 with a socket flange booster chamber 9' which has an integrated solar unit. For this unit is centrally in the solar surface, a further rotation flange plug connection 27 provided, for the purpose to accommodate a socket flange booster chamber 9' with an integrated antenna and remote signal control unit. The socket flange booster chambers 9' of the multiblock standard parts 1 which are provided with socket flange booster chambers 9' having integrated solar units, comporte rotation flange plug connections 2 with current and communication channels and with mounted driving windings. Each central chamber 9 of the multiblock standard parts 1 for socket flange booster chambers 9' with integrated solar units, contains furthermore built-in equipment of the battery charge electronic, voltage transformers and for the control of the own driving windings, so that each multiblock standard part 1 with socket flange booster chamber 9' and integrated solar unit, is an autonomous solar energy transformer and in combination with multiblock-articulated frames and multiblock-articulated arms, it is additionally multi-axis rotatable, with rotation possibilities over the horizontal, vertical and central axis, as far as the horizontal, vertical or the central back side rotation flange plug connections 2 have been chosen as active plug connections. Thus, a continuous adjusting of the sun collector surfaces can be accomplished, by a permanent adaptation of the sun collector surfaces always perpendicular to the continuously changement of the sun positions, for an optimal energy generation adjustment in accordance with the continuous positional changement of the sun-beam directions. The installation may be assembled to stand alone, in combination with any other multiblock standard part, socket flange booster chamber 9' or within of multiblock-articulated frame. The same for socket flange booster chamber 9' with integrated battery units. Also these comporte the system typical multiblock robot engaging plugs, spring-loaded clamp levers, magnetic lockings with plug-units and plug contacts on one side and in opposite position, to each other compatible plug sleeve units with plug sleeves which are all interconnected by the current and communication channels, leading through the battery center axis. In the present installation they are plug connected with a rotation flange plug connection 27 of the multiblock-articulated frame where they are easy of access for the users in order to accomplish exchange operations, or they are plug connected for the own system power supply at optional rotation flange plug connections 27, near to the system units which have to be supported. The socket flange booster chambers 9' with integrated battery units are plug connected one behind the other and secured against undesired removal by means of the both sided engaging plugs and plug sleeves with spring-loaded clamp levers and magnetic lockings. The plug connection can be accomplished in horizontal and vertical position. The final combination and assembly of the present mobile multiblock robot energy station is able to adjust all installed solar units precisely perpendicular to the respective position of the sun. The vertical adaptation is obtained by the rotation of the total multiblock-articulated frame. The horizontal adaptation of the multiblock standard parts 1 with socket flange booster chambers 9' and integrated solar units which are accommodated within the multiblock-articulated frame, is obtained by a rotation in the common articulation points by the driving windings of the central chambers 9 which are inside of the multiblock standard parts 1 and, for the multiblock standard part 1 in head position which comprises socket flange booster chambers 9' with integrated solar units combined with an antenna and remote signal control unit the adaption is accomplished by the multiblock-articulated arm. The generated current from the solar cells of the solar units is conducted to the battery charge electronic, to the voltage transformers and through the current and communication channels which distribute the current and the control and communication signals throughout the total system, the solar current is conducted to the different rotation flange plug connection 2,27,27', to the plug connected battery units and to the integrated system units, so to the driving windings for the rotation operation and to the driving windings of the belt driving units. Moreover has each rotation flange plug connection 2,27,27', from one end of the current and communication channel to the opposite end, in the core region, mains sockets and the opposite side mains plug functions and can directly be used from consumers for the direct current supply by means of mains compatible plug and cable connections. The antenna and remote signal control unit provides the signal transmission from and to the remote control units. The control of the total system, as the checking of the precise perpendicular adaptation of the solar units, the state of the battery charge condition, processing of the remote control signals, evaluation of the data for image recognition and of the movement sensors, is accomplished by the multiblock control computer. The local control is provided by the socket flange booster chambers 9' with integrated infrared control units or optional remote control, by the socket flange booster chambers 9' with integrated antenna and remote signal control unit. Small multiblock robot energy stations receive only a socket flange booster chambers 9' with integrated time relay which controls the adaptations in accordance with the position of the sun. Most multiblock standard parts 1, socket flange booster chambers 9' and also the raster dimensions and the performance data which are valid for the mobile robot energy station, can be used without any changement for the exchange with multiblock standard parts 1 and socket flange booster chambers 9' of multiblock robots and for multiblock electro cars. Especially the socket flange booster chambers 9' with battery units are identical with the battery units for multiblock robots and for multiblock electro cars. Therefore has the mobile multiblock robot energy station an important support function for these multiblock systems. As such, particularly for self operating robots with outside tasks on earth and moreover for space projects, together with multiblock electro cars. System units which have to operate without usual access and supply possibilities, can be reached and near to the operation location, supported by the mobile multiblock energy station. The different standard parts are light weighted and of practical handling size. In so far, the installation of the mobile energy station, as also the exchange of batteries, can easily and fastly be accomplished by the multiblock robots themselfs, because there are only plug connections with plug in and plug out operations needed. The storage of spare parts and the parts spectrum for the mobile robot energy station, for multiblock robots and for multiblock electro cars can be reduced, because they are always of identical structure and broadly exchangeable with each other.

Figure 2:
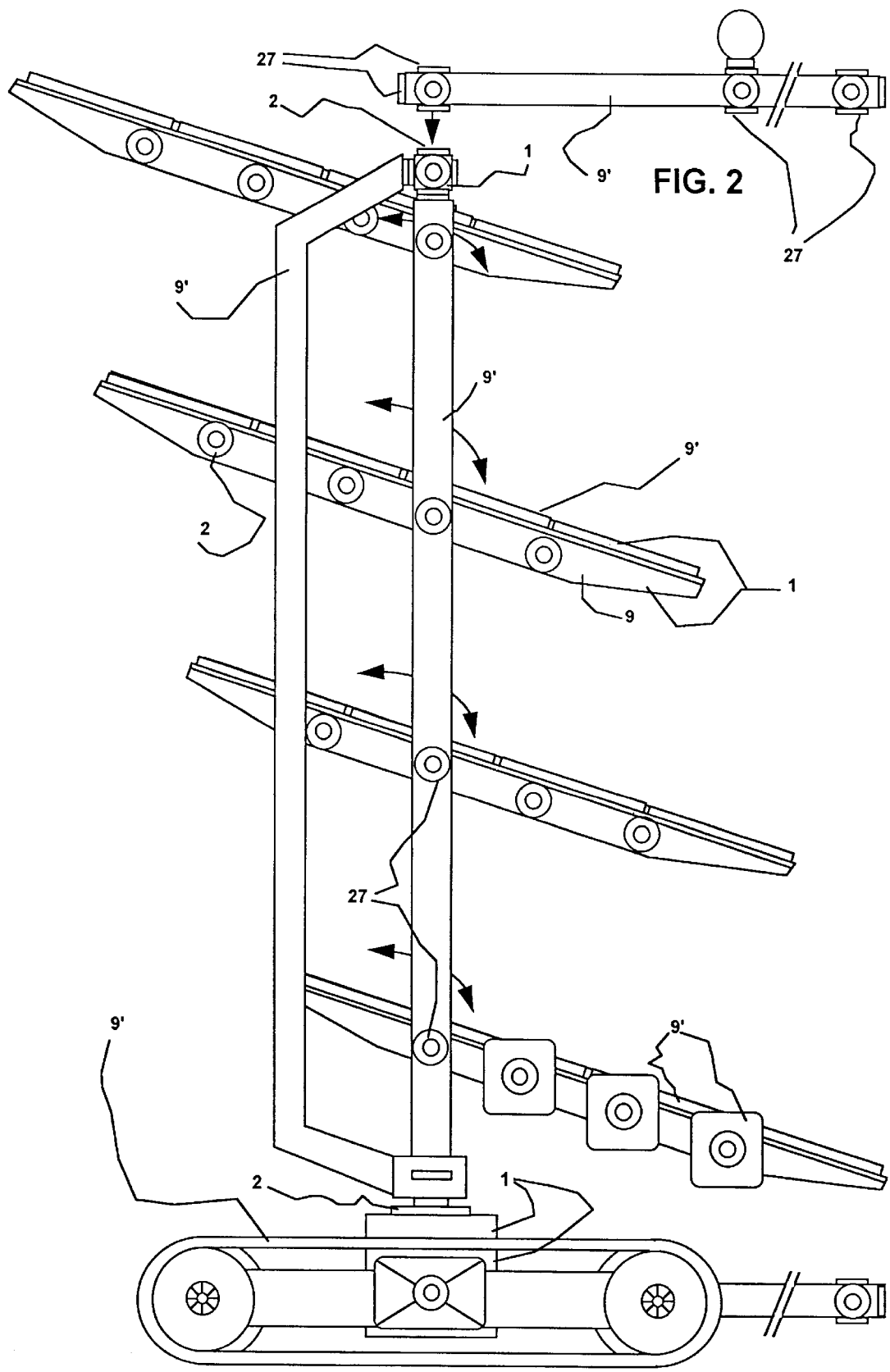
FIG. 2 is a side view of a mobile multiblock robot energy station for solar energy generation, energy storage and energy delivery, having a medium performance capacity and a multiblock connection to other multiblock energy stations.

Referring to FIG. 2, it shows a mobile robot energy station which is connected with a further mobile robot energy station by horizontal junction socket flange booster chambers 9' in ground and head position, with the effect of doubling the energy for this compound mobile energy station. The horizontal junction socket flange booster chambers 9' can likewise be plug connected at the vertical rotation flange plug connections 27 with optional multiblock components and assembly groups. The horizontal junction socket flange booster chambers 9' do not prevent the free rotation and adjustment of all individual solar and windrotor units together with its accessory assembly groups, of the total compound mobile energy station. The horizontal junction socket flange booster chambers 9' accomplish the plug connection of the current and communication channels of two individual mobile energy stations but they have moreover a horizontal, mutual support function. Each of the present multiblock energy stations has also a multiblock-articulated frame with four multiblock standard parts 1 and socket flange booster chambers 9' with integrated solar unit. The central chambers 9 of the multiblock articulated frames comprise an optional number of solar units and have accordingly laterally the same or more numbers of rotation flange plug connection 2, arranged one above the other and displaced like a staircase in order to prevent shadow effects in the always adjusted perpendicular position to the position of the sun and thus, to have constantly all installed solar cell surfaces, shadow free for sun irradiation. The rotation direction of the multiblock-articulated frames with the multiblock standard parts 1 having socket flange booster chambers 9' with integrated solar units, is illustrated by the bended arrow lines.

Figure 3:
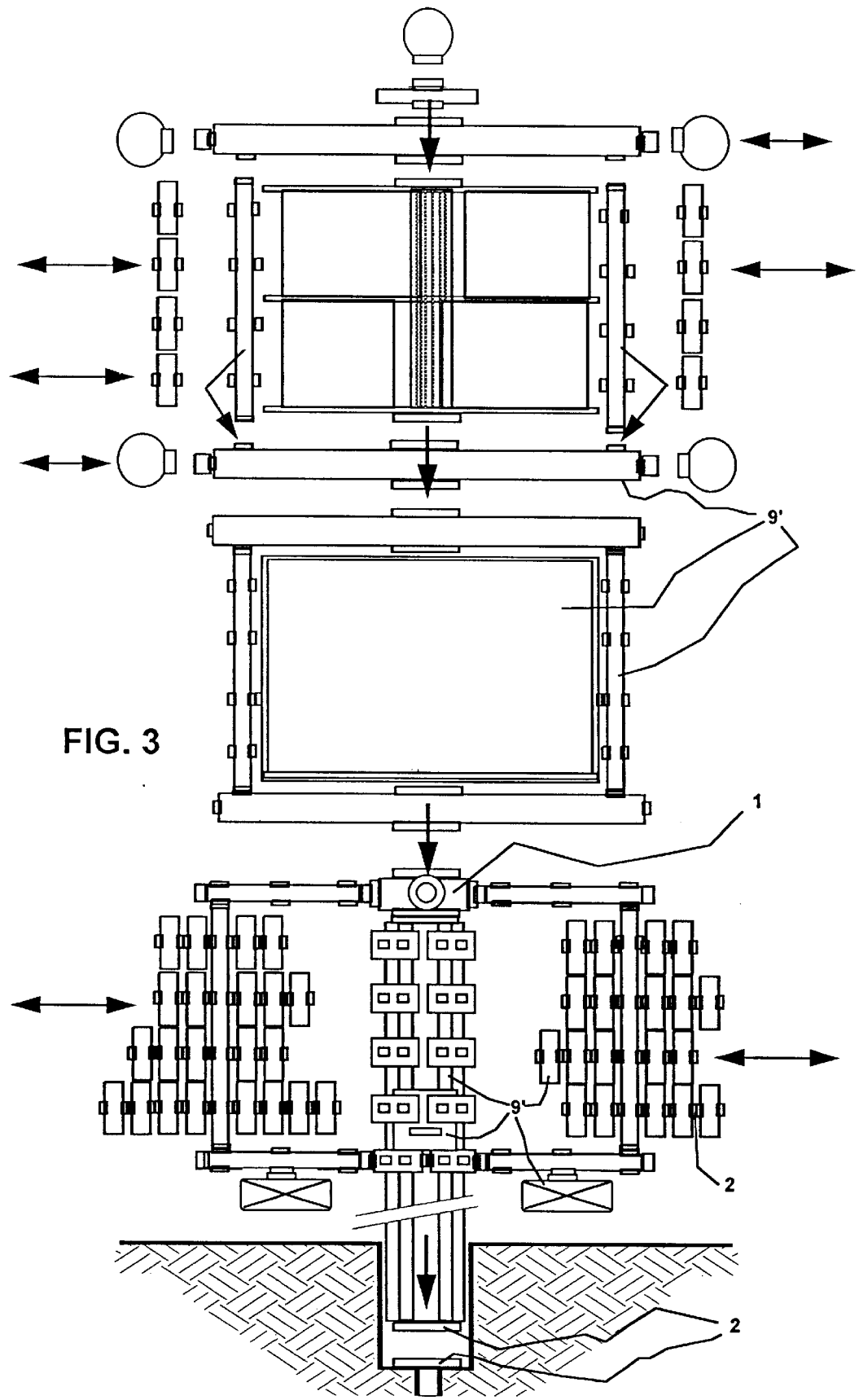
FIG. 3 is a front view of a stationary multiblock robot energy station for combined solar and wind energy generation, energy storage and energy delivery, having a medium performance capacity and a battery dispenser for manual battery exchange.

Referring to FIG. 3, it shows that the mobile multiblock energy stations in accordance with FIGS. 1 and 2 can always be changed to a stationary multiblock energy station by a removal of the installed multiblock belt and wheel units and plug connected replacement by a stationary multiblock standard part 1, a stationary multiblock-articulated arm, or by a multiblock-socket flange booster chamber 9', which has a central, cylindrical and vertical support function and which is itself plug connected with a rotation flange plug connection 2,27,27', installed on a foundation base, with connection to the public mains. In the present illustrated case, the vertical support comprises three multiblock standard part groups. Near to the ground, accessible for the user and for multiblock robots, is provided a battery dispenser for manual battery exchange, composed of a multiblock 1 with vertical and horizontal rotation flange plug connections 2 and on the left and the right side, with multiblock-articulated frames which have only one vertical socket flange booster chamber 9' on the outside. This socket flange booster chamber 9' comprises on the left and the right side, socket flange booster chambers 9' with integrated battery units. The lowest positioned, horizontal socket flange booster chambers 9', contain always one socket flange booster chamber 9' with control electronic for sensoric and are plug connected with socket flange booster chambers 9' with integrated rotation support rollers which surround rotatably the cylindrical, vertical support. For each left and right sided horizontally plug connected battery line are provided optical charge indicators, as also the socket flange booster chamber 9' with integrated control computer unit, this comprising a checkcard reader unit. Users which desire to exchange an empty battery unit against a freshly charged battery unit, have to put a checkcard, respectively a codecard into the computer slot for the verification of access justification and have than to put a socket flange booster chamber 9' with integrated battery unit which has to be recharged, on a battery line with yellow indicators, indicating that this battery line is in a recharge state. Afterwards can the user remove a battery unit of a battery line with green indicator, indicating that its battery units are fully recharged. For this purpose, the computer unit activates the release operation of the magnetic lockings of the battery unit in end position on the battery line, for the delivery and withdrawal of a fresh battery unit. The total battery lines, provided for the multiblock-articulated frames on the left and right side of the cylindrical multiblock-vertical support, can be manually rotated in each direction around the multiblock vertical support for an easy battery removal and afterwards, they are self operating rotated to the previous original position, by the driving windings in the multiblock standard part 1 in head position of the cylindrical vertical support, under control of the control computer unit. The vertical rotation flange plug connection 2 of the multiblock standard part 1 in head position of the cylindrical vertical support receives the second and third multiblock standard part group. These are composed of two vertically one above the other arranged multiblock-articulated frames. Contrary to the multiblock-articulated frames of the FIGS. 1,2, the multiblock-articulated frame in low position comportes only one multiblock central chamber 9 and socket flange booster chamber 9' with integrated solar unit. The multiblock-articulated frame in head position receives a multiblock robot standard part 1 which has a cylindrical multiblock central chamber 9 with vertical rotation flange plug connections 2 and generator windings, and which is plug connected with a socket flange booster chamber 9', having integrated a wind rotor with a vertical rotor axis. On the vertical outer sides of the multiblock-articulated frame are provided four socket flange booster chambers 9' with integrated battery units. They are here plug connected and are not at the disposition for users, but for the own, total system current supply. The free rotation flange plug connections 27 of the upper multiblock-articulated frame are optionally plug connected to socket flange booster chambers 9' with integrated illuminator units and this multiblock-articulated frame receives five illuminators. The three multiblock standard part groups, arranged one above the other, as with the multiblock battery dispenser, the multiblock solar unit and the multiblock wind power and illuminatar units, can be combined in optional sequence. They can be combined with any other standard part group to a total system unit or to a stand alone system unit. Furthermore, they can be combined optionally with any other multiblock standard part 1, by plug connection from rotation flange plug connections 2,27,27' to rotation flange plug connections 2,27,27', or exchanged with energy system external multiblock robot applications, as multiblock robots and multiblock electro cars. Thus there are also in the present embodiment, the socket flange booster chambers 9' with integrated battery units directly exchangeable and can be replaced by self operating multiblock robots themselfs or by users of electro cars, in order to recharge or to exchange their batteries. The field of applications comprises the installation at optional locations, at road borders, pertrol stations, at car parks and, in different combinations for the purpose of an easy and quick delivery to multiblock electro car users, and as such, for the promotion of the number of multiblock electro cars in the traffic, as also for the battery energy supply of self operating multiblock robots during outside works, as during road construction or road cleaning works.

The stationary multiblock robot energy station illustrated in FIG. 4, comprises two multiblock-articulated frames, each with four multiblock standard parts 1 with socket flange booster chambers 9' and integrated solar units, and each with a solar unit in head position being plug connected on a back sided rotation flange plug connection 27 with multiblock-articulated arms to the horizontal socket flange booster chamber 9' of the multiblock-articulated frame. These head positioned solar units are therefore freely, multi-axis rotatable. The both multiblock-articulated frames are centrally, in head position plug connected by means of a multiblock standard part 1 and they are freely rotatable in horizontal direction. Between the both centrally arranged multiblock standard parts 1, is provided a cylindrical socket flange booster chamber 9' with central and vertical support function. The rotation flange plug connection 2 of the multiblock standard part 1 in head position receives furthermore a multiblock standard part with integrated driving and generator windings inside of the central chamber 9 and additionally, a socket flange booster chamber 9' with integrated wind rotor, having a horizontal rotation axis. The solar units and the wind rotor unit can simultaneously charge battery units or generate current for the direct supply of the own system units, or furthermore separately, in accordance with the prevailing weather situation, the wind direction and the position of the sun. Further equipment for this energy station is a self operating battery changer for multiblock electro cars, which is installed in ground level. The battery changer is in principle an assembly like the battery dispenser in accordance with the FIG. 3. However, the battery removal is accomplished without any additional manual handling. The multiblock electro cars are provided with socket flange booster chambers 9' having an integrated control computer for the control of all vehicle operations and for the evaluation of the plug connected multiblock sensoric.

They are further provided with checkcard readers which are compatible with the checkcard reader of the multiblock control computer in accordance with the FIG. 3. The multiblock electro cars receive a socket flange booster chamber 9' with integrated infrared movement sensors and a socket flange booster chamber 9' with integrated antenna and remote signal control unit. In correspondence to this equipment, the infrared movement sensors and socket flange booster chamber 9' with integrated antenna and remote control signal unit are also provided in socket flange booster chambers 9' of the multiblock battery changer. The vehicles have moreover socket-flange booster chambers 9' with integrated battery venetian blinds which are self operating opened and closed and protect the batteries on the front side, in ride direction. For the battery exchange puts the car driver of the multiblock electro car the checkcard with access justification into the checkcard reader of his control computer, which is provided near to the steering wheel and releases the self operating battery exchange. The multiblock-standard parts 1 of the electro car are driving and leading the car, as indicated in the drawing with the arrow, in direction of the rotation flange plug connection 2 to the battery line of the battery changer, precisely guided and positioned by the infrared sensors and tele commands. The battery changer comprises four battery lines which are arranged in a star-shaped order at 90 degrees displaced to each other. The electro car, positioned for the battery exchange opens the venetian blinds and release its empty batteries for the delivery to a battery line which permits a recharge operation. Than the car is moved backwards for some inches and the battery changer rotates at 90 degrees for the delivery to the vehicle. This is than again driven in direction of the battery line and receives a socket flange booster chamber 9' with integrated battery unit which is recharged. The board computer supervises the drive operations and the battery exchange of individual battery units or of a battery block with several units together. Accordingly operates the control of the magnetic lockings inside of the rotation flange plug connections 27,27' with engaging plugs and plug sleeves, for the release of single units individually or of several units jointly. The control computer releases the vehicle for driving only if the battery exchange has been successfully accomplished and this is signaled by an acoustic and optical indicator provided inside of the car.

Figure 5:
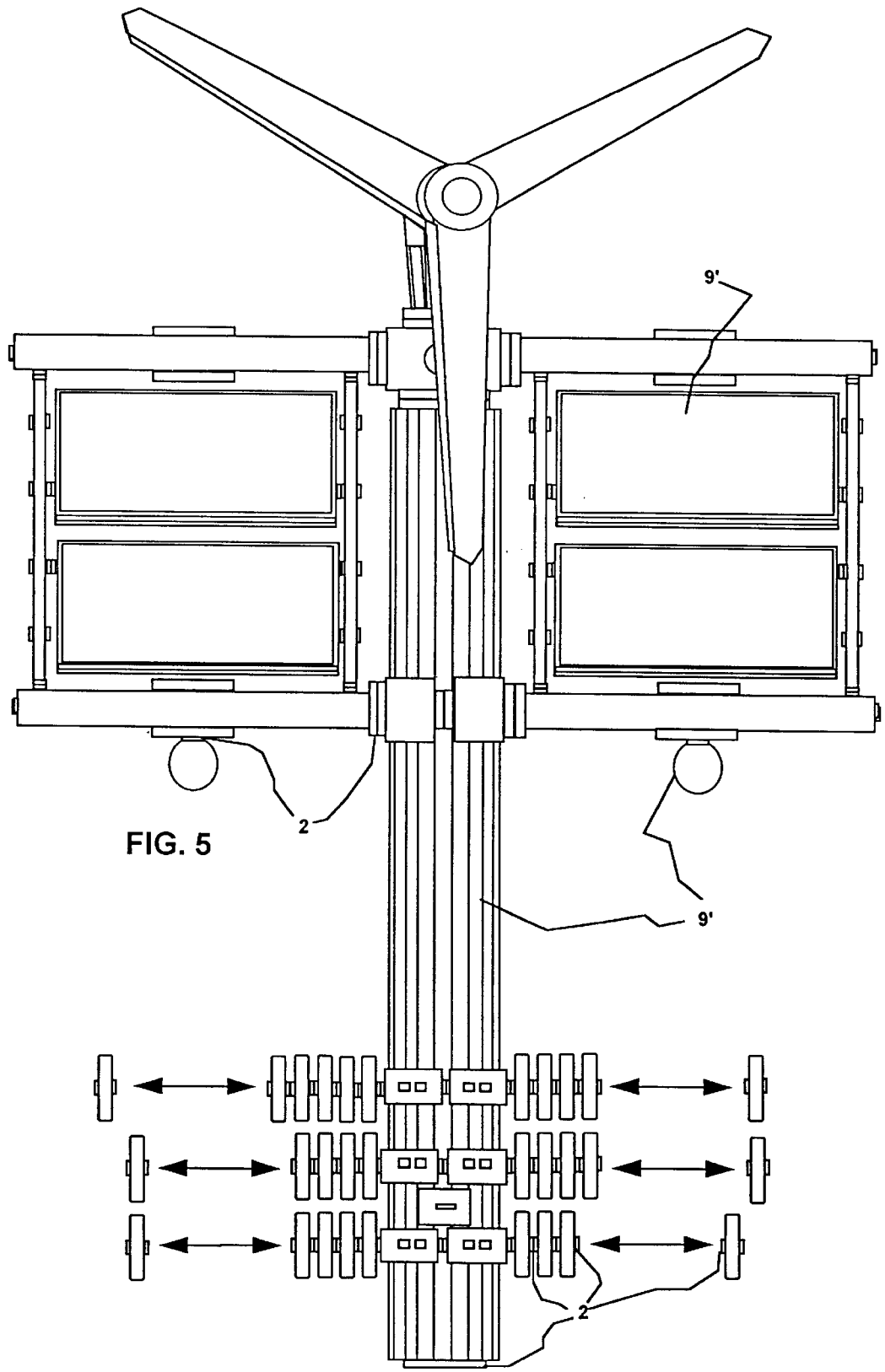
FIG. 5 is a front view of a stationary multiblock robot energy station for combined solar and wind energy generation, energy storage and energy delivery, having a medium performance capacity.

As shown in FIG. 5, the cylindrical socket flange booster chamber 9' with vertical support function, comprises near to the ground four rotation flange plug connections 27, which are arranged vertically in a line one above the other. To these rotation flange plug connections 27 is plug connected the multiblock control computer with checkcard reader, as also horizontally three battery lines, comprising optical battery charge indicators. In head position is provided a multiblock standard part 1 with horizontal and vertical rotation flange plug connections 2. Plug connected on the left and on the right side to this position, are two multiblock-articulated frames having socket flange booster chambers 9' with integrated solar units which comprise between each other a multiblock standard part 1 with integrated wind rotor, having a horizontal rotation axis, in addition with a central chamber 9 which contains inside generator windings arranged around the central current and communication channels. The multiblock-articulated frames can also be provided with socket flange booster chambers 9' with integrated wind rotor units, having a vertical rotation axis and with integrated battery units or illuminators. Below to each of the multiblock-articulated frames is plug connected a socket flange booster chamber 9' with integrated illuminator unit. The both multiblock-articulated frames are laterally, rotatably supported at the central cylindrical socket flange booster chamber 9' with vertical support function by a socket flange booster chamber 9' with integrated rotation support roller units. In accordance with the position of the sun and the corresponding control informations from the control computer unit, the total upper parts group is rotated about the center axis by the multiblock standard part 1 in central head position. The rotation of the solar units, provided inside of multiblock-articulated frames, is accomplished analogously to FIGS. 1 to 4, by the driving windings inside of the attached central chambers 9. The present system installation is likewise a method of the combined sun-wind energy generation, which can be changed, easily and quickly extended by users without special knowledge, by adding or differently combining to the selected rotation flange plug connections 2 the same parts groups and supplementary multiblock standard parts 1. The addition or removal of solar units or wind rotor units is accomplished in accordance with the saisonal weather changements and the energy turnover expectancies. In winter times the solar units are exchanged against wind rotor units. In sommer times are mainly multiblock solar units provided. For the exchange operation, the multiblock-articulated frames itselfs have not to be exchanged but only the solar or wind rotor units, because they have the identical raster dimensions and fit precisely in the same multiblock-articulated frame, possibly however plug connected on different rotation flange plug connections 2,27,27'. The stationary multiblock robot energy station shown in FIG. 6 achieves about the treble energy generation performance in comparison with the system illustrated in FIG. 5. There is centrally provided a socket flange booster chamber 9' with integrated wind rotor, having a vertical rotation axis, and attached to it a central chamber 9 with generator windings. It is centrally plug connected between two multiblock standard parts 1 and has also a support function for the total upper energy generation unit. Additionally to the four laterally arranged multiblock-articulated frames with integrated solar units is provided in head position a large-scale multiblock-articulated frame which extends over the total width of the energy station and is centrally plug connected by means of the multiblock-articulated arm on the rotation flange plug connection 2 of the head positioned multiblock standard part 1. This multiblock-articulated frame is shown in the drawing in a slightly rotated position in relation to the total installation. Against the high vertical and horizontal forces and stresses which are effective on the articulated points of the multiblock standard parts 1, the attached central chambers 9 and of the socket flange booster chamber 9', the rotation flange plug connections are provided with vertical screwed pipe joints for the firm and undisplaceable plug connection of the rotation flange plug connections 2,27,27', and which are effective in 90 degrees to the rotation axis, in addition to the plug connection by means of the engaging plugs and spring-loaded clamp levers, which are the overall protection means for undisplaceable plug connections of the parts to each other. The stationary multiblock-robot energy station illustrated in FIG. 7 is a combined solar-wind energy station and shows the transformation of an existing wind energy station to a multiblock robot energy station, with the effect of a considerable and multiplied performance enhancement in energy generation, without to change or to encrease the necessary installation area. For this, the existing reinforced concrete mast remains unchanged and is further used, the existing wind rotor however is removed and a rotation flange plug connection 2 is mounted in head position of the mast, whereas the central current and communication channels are placed inside of the mast, up to the existing mains connection units and are connected with these units. This rotation flange plug connection 2 has a plug connection abutment function for a multiblock standard part 1 with horizontal and vertical rotation flange plug connections 2. The upper rotation flange plug connection 2 is plug connected with a multiblock standard part 1, having a socket flange booster chamber 9' with integrated wind rotor unit, having a horizontal rotor axis. Each of the both horizontal rotation flange plug connections 2 receive a multiblock-articulated frame which comprises two multiblock standard parts 1 with socket flange booster chamber 9' with integrated solar units. The both articulated frames are rotatably guided and supported at the bottom of the reinforced concrete mast by means of a socket flange booster chamber 9' with integrated rotation support roller units. On a free vertical rotation flange plug connection 1 which is accessible from the ground, is plug connected a socket flange booster chamber 9' with integrated control computer unit. The generated energy is partly stored in battery changers, installed in a distant, not shown position to the energy mast, and in principle operating like the battery changer of the bottom parts group illustrated in FIG. 4. Moreover, another part of the generated energy is supplied to the public mains. The arrow lines show the movement for the perpendicular rotation adjustment, in accordance with the position of the sun and the respective wind direction, of the both articulated frames. The horizontal rotation of the both articulated frames together is accomplished by the multiblock standard part 1 which is provided in head position on the reinforced concret mast. The solar units are vertically rotated about the own axis by the driving windings inside of the attached central chambers 9. The wind rotor unit is separately rotatable and adjustable, independently of the solar units, respectively of the multiblock-articulated frames. With increasing wind power, the solar units are so rotated, that they have the least resistance against the wind power. With encreasing sun power and at the same time low wind power, the wind rotor is rotated between and rectangular to the multiblock-articulated frames in head position, in order to avoid shadow effects on the solar surfaces.

Figure 6:
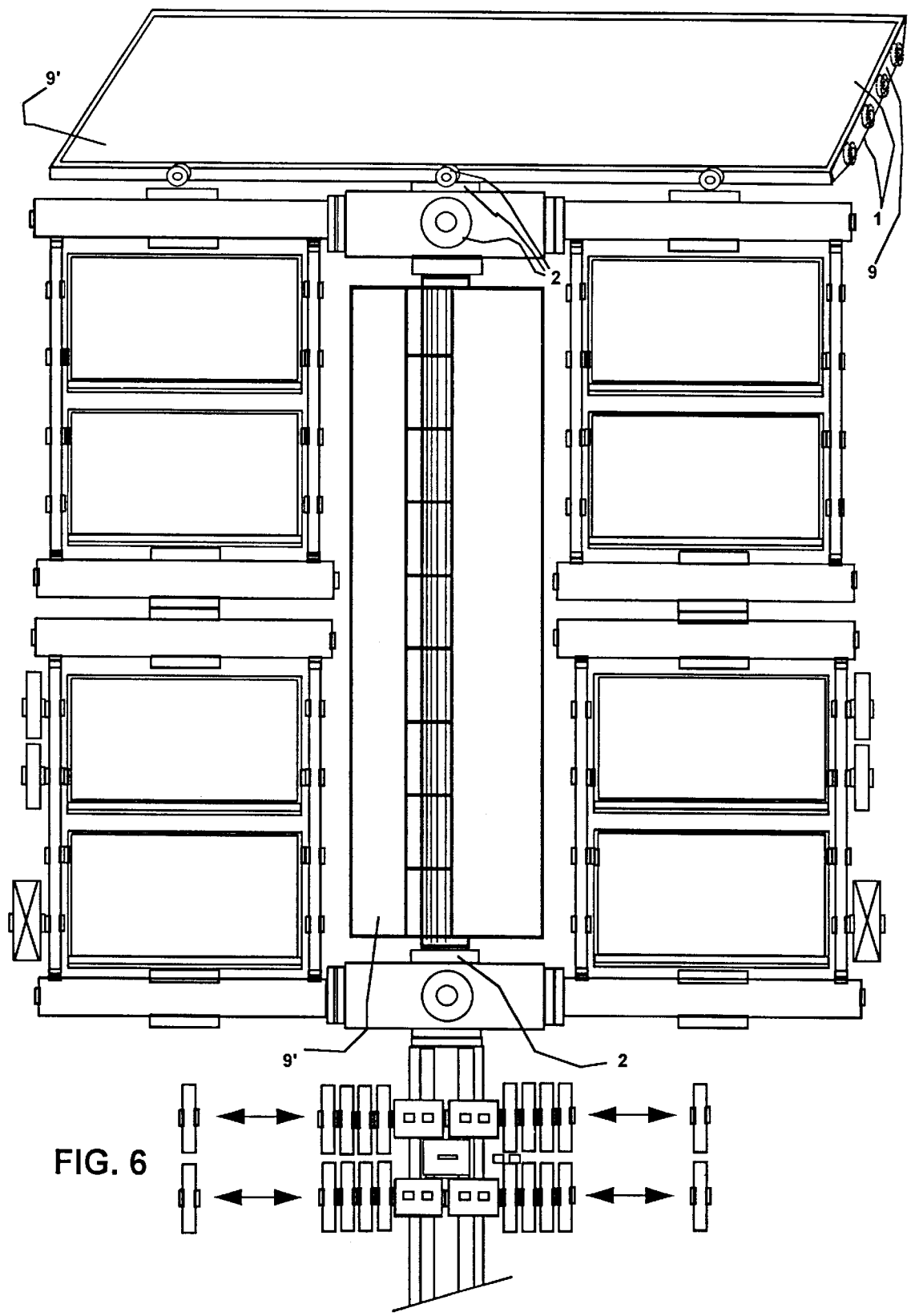
FIG. 6 is a front view of a stationary multiblock robot energy station for combined solar and wind energy generation, energy storage and energy delivery, having an enhanced performance capacity in comparison with the stationary energy station shown in FIGS. 4 and 5.
Figure 7:
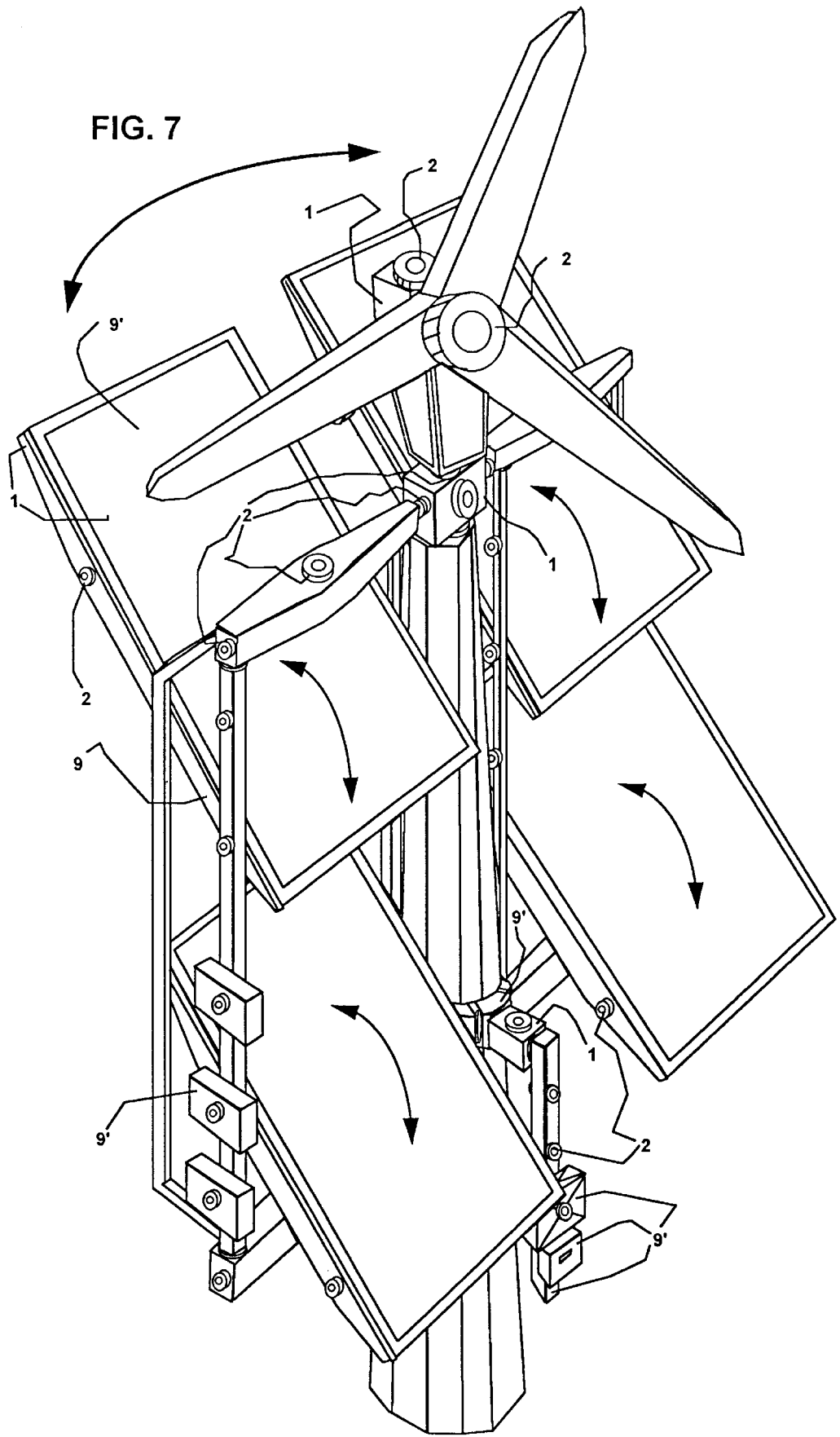
FIG. 7 is a perspective view illustrating the transformation of an existing wind energy station to a stationary multiblock robot energy station for combined solar and wind energy generation, energy storage and energy delivery, having an enhanced performance capacity in comparison with the stationary energy station shown in FIG. 6, comprising always two socket flange booster chambers with integrated solar units per multiblock-articulated frame.
Figure 8:
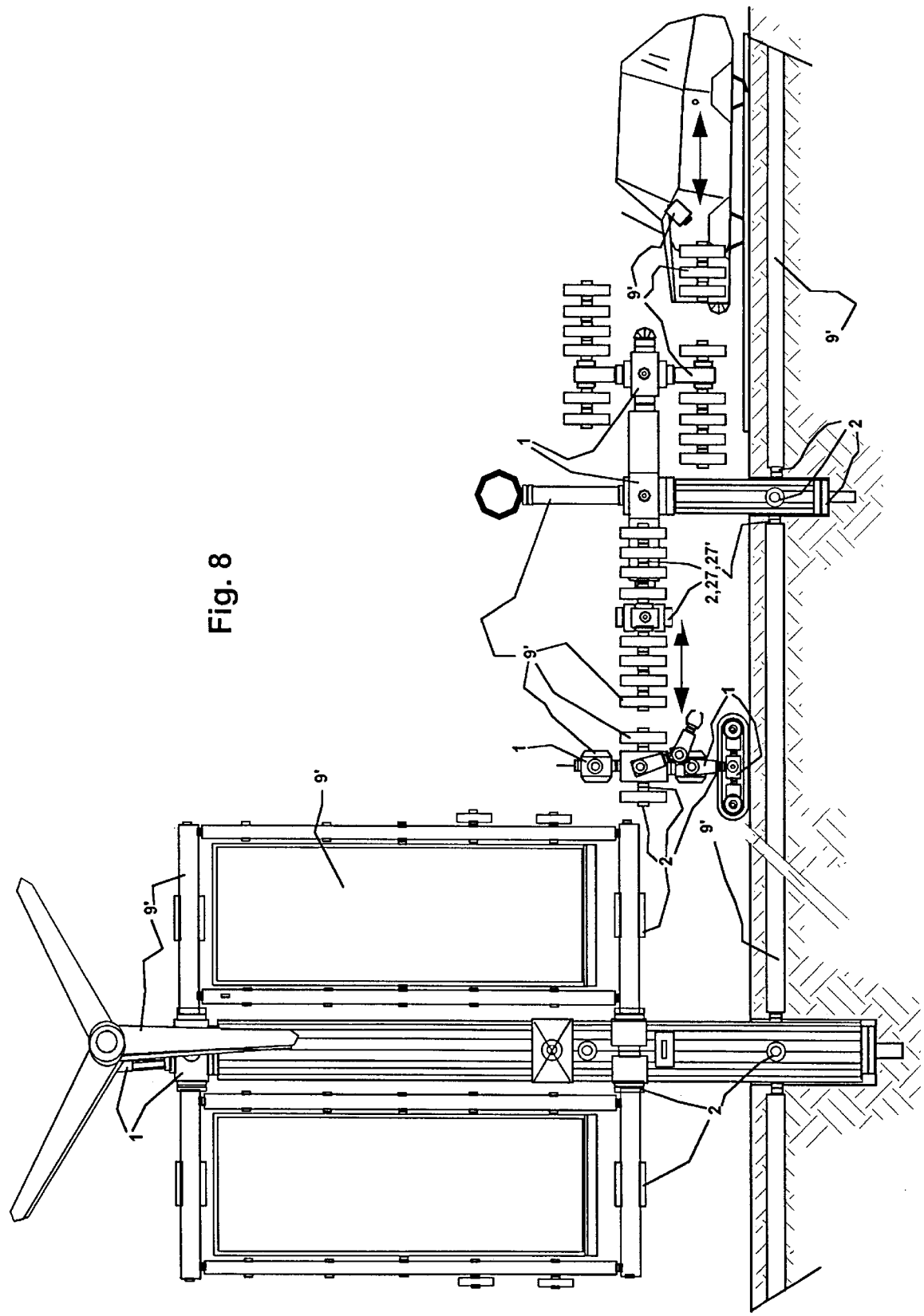
FIG. 8 is a front view of a stationary multiblock energy station for combined solar and wind energy generation, energy storage and energy delivery, comprising one socket flange booster chamber with integrated solar units per multiblock-articulated frame and a self operating battery changer in a separate installation position.

The stationary multiblock robot energy station shown in FIG. 8 corresponds in the installation principle with the stationary multiblock robot energy station in accordance with the FIGS. 4, 5 and 6. However it comprises only one large scale standard part 1 with integrated solar units per multiblock-articulated frame. But also the multiblock-articulated frames for large scale solar units can be optionally selected and provided with wind rotor units instead of solar units. So has the wind rotor with vertical rotation axis shown in FIG. 6, which has also a support function, identical raster dimensions and can be added to the present stationary energy station or is optionally provided for the multiblock-articulated frames shown in FIG. 7, with plug connection to the rotation flange plug connections 2 of the horizontal socket flange booster chambers 9' in head and bottom position. The solar units per articulated frame can be provided in different number and different raster sizes. The raster sizes of the articulated frames and the number of the rotation flange plug connection 27 are so selected, that optionally some of the small solar units shown in FIGS. 1 to 6 can be provided, or two, or only one solar unit, as the plug connection shows for the present energy station. The selection of the most advantageous combination out of the multitude of multiblock system possibilities is determined by the regional situation, the installation site, the logistic circumstances for the transport, the handling assistance for large scale solar units, and by the energy profit anticipation. For the present stationary multiblock robot energy station is the energy delivery achieved by a multiblock battery changer in distant position to the main installation which has centrally, in head position, a socket flange booster chamber 9' with integrated illuminater unit The connection between the main installation and the battery changer is accomplished by the horizontal junction socket flange booster chambers 9' which are here placed below the ground. The function of the battery changer, the principle conception and the battery exchange operation are achieved in accordance with the battery changer as illustrated in FIG. 4. In the present case however, is the self operating battery exchange accomplished for multiblock electro cars and also for multiblock robots. Therefore, there are arranged two battery lines, on the left and on the right side of the socket flange booster chamber 9' with vertical support function and plug connected multiblock standard part 1, which are rotatable about the horizontal axis and additionally rotatable about the vertical axis, whereas each individual battery line is moreover alone rotatable about the own vertical axis. The multiblock robot exchanges the batteries equally self operating as the multiblock electro car. For the multiblock robot, the two battery lines on the left side are rotated at 180 degrees and than precisely to the exchange height for the multiblock robot which, activated by the stored program for battery exchange of the central control computer of the robot, drives in straight direction to the aligned battery line and the battery exchange is achieved without additional handling or movement operations, analogously as the battery exchange for the electro car. The multiblock robot is both sided provided with socket flange booster chambers 9' with integrated battery units. The robot upper part can be rotated at 360 degrees about the own axis by the rotation flange plug connections 2, attached to its multiblock standard part 1, thus the both sided battery exchange is achieved without that the total robot has to be rotated or moved about the own axis. All systems, the multiblock robot, the multiblock electro car and the multiblock battery changer are provided with exactly identical infrared movement sensors and socket flange booster chambers 9' with integrated antenna and remote signal control units. The multiblock battery changer has, as like as the stationary energy station, connection with the public mains by means of the rotation flange plug connection 2, placed in the foundation. Multiblock battery changers and multiblock battery dispensers can optionally be combined with the mobile energy stations in accordance of the FIGS. 1 to 3.

Figure 9:
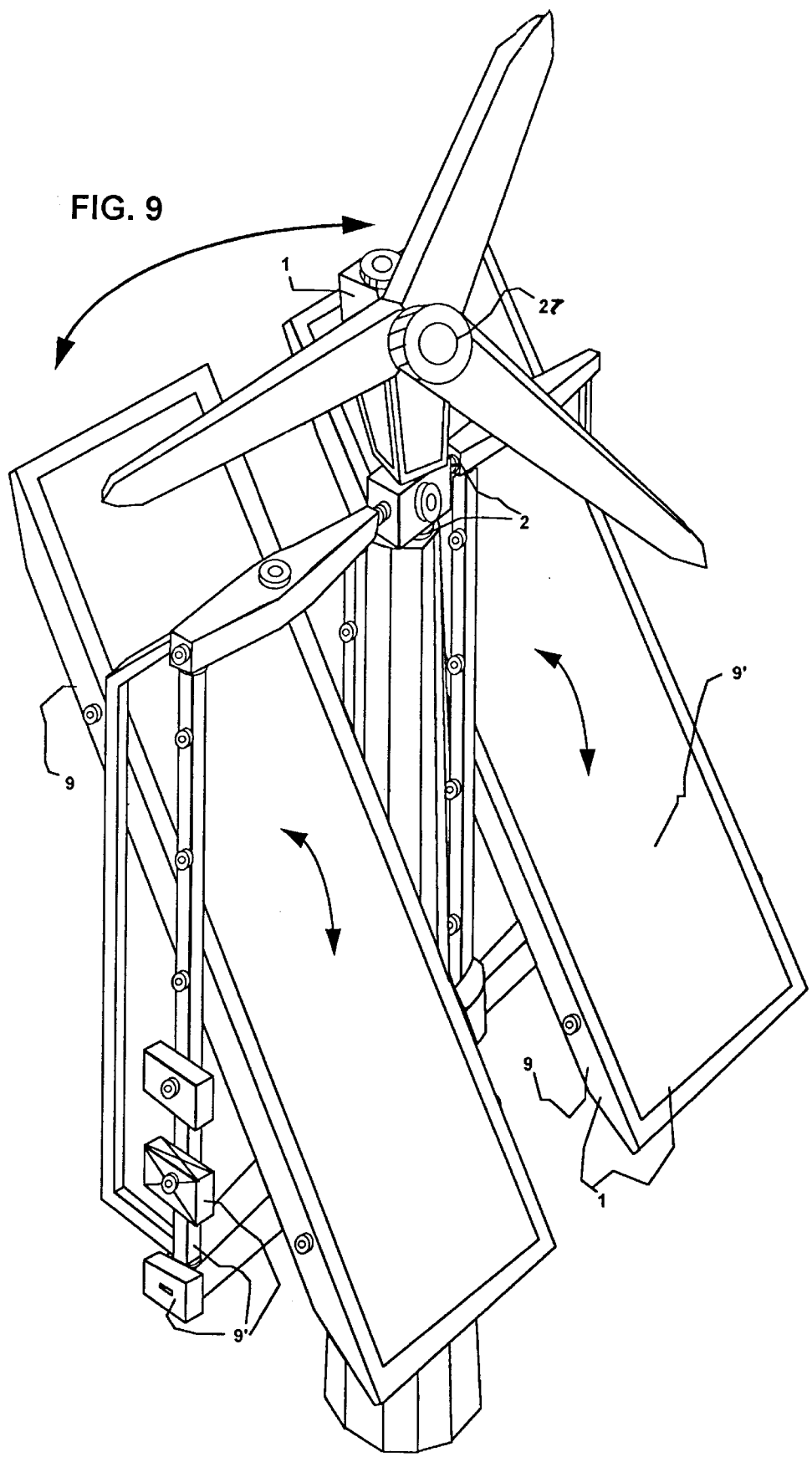
FIG. 9 is a perspective view illustrating the transformation of an existing wind energy station to a stationary multiblock robot energy station for combined solar and wind energy generation, energy storage and energy delivery, comprising always one socket flange booster chamber with integrated solar units per multiblock-articulated frame.

The stationary multiblock energy station illustrated in FIG. 9 is a combined solar-wind energy installation and shows the transformation of an existing wind energy station to a multiblock-robot energy station in principle as the system shown in FIG. 7. However, there are provided one-piece large scale solar units per multiblock-articulated frame, as for the articulated frames of FIG. 8. The multiblock-articulated frames with only one socket flange booster chamber 9' with integrated solar unit can also be replaced by a multitude of socket flange booster chambers 9' with integrated solar units or by socket flange booster chambers 9' with integrated wind rotor units having a vertical rotor axis and identical raster dimensions as have the socket flange booster chambers 9' with integrated solar units. The socket flange booster chambers 9' with integrated sensoric and with integrated control computer unit are here laterally plug connected with the rotation flange plug connections 2 of the vertical socket flange booster chambers 9' of the multiblock-articulated frames. Distant multiblock battery dispensers and battery changers accomplish the optimal energy delivery to users. Any surplus of energy generation is delivered to the public mains.

I claim:

1. A multiblock robot system comprising:

multiblock standard parts, combined of socket flange booster chambers with integrated solar units and socket flanges for plug connections with central chambers, having built in equipment of the solar electronic and voltage transformers and, rotation flange plug connections on the outer edges and on the back side;

said multiblock standard parts combined with solar units, articulated frames, socket flange booster chambers with central and vertical support function, horizontal junction socket flange booster chambers, multiblock-articulated frames which are horizontally and vertically plug connected and composed of said socket flange booster chambers with socket flanges;

said combinations with said socket flange booster chambers, provided with integrated battery units, plug connected one behind the other, composing battery lines with self locking solenoid switches in said rotation flange plug connections for self operating locking and unlocking of battery units during a battery exchange, said battery lines as such composing multiblock-battery dispensers and multiblock-battery changers with a multitude of said battery lines;

said combinations with said socket flange booster chambers, provided with integrated illuminator units, with integrated wind rotor units having a horizontal or vertical rotation axis, with integrated control computer units and said socket flange booster chambers with integrated sensor and control electronic units;

said combinations and said plug connections from one of said rotation flange plug connection to the other, of single or multiple of said multiblock standard parts, for the accomplishment of a variety of autonomous, self operating multiblock energy stations for solar and wind energy generation, energy storage, energy disposition and delivery, rotating the solar surfaces and the wind rotor blades always to the perpendicular position of the sun and wind directions.

2. The multiblock robot system of claim 1 wherein said combinations of said multiblock energy stations with said multiblock standard parts are provided with booster chambers with integrated wheel and belt driving units;

said combinations having socket flange booster chambers with integrated movement and image recognition, infrared control sensor, integrated antenna and remote control units;

said combinations provide mobile, location independent, local and remote controlled, self operating installations of said multiblock energy stations.

3. The multiblock robot system of claim 1 wherein said multiblock-articulated frames further comprise a plurality of socket flange booster chambers with said integrated solar units, plug connected in said multiblock-articulated frames on said rotation flange plug connections, the plurality of said integrated solar units are individually and separately rotated by means of said rotation flange plug connections and are arranged one above the other, said plurality of socket flange booster chambers with said integrated solar units are arranged one above the other and in the side contour, staircase-shaped displaced to each other.

4. The multiblock robot system of claim 1 wherein said socket flange booster chambers with said vertical support functions with inside current and communication channels, lead to rotation flange plug connections provided on bottom, head and side positions;

said bottom rotation flange plug connection of said socket flange booster chamber with vertical support functions are placed below ground in the foundation, connecting central current and communication channels inside of said vertical support functions to the public mains;

said socket flange booster chambers with vertical support functions support parts groups one above the other and one beneath the other, consisting of said combinations with said solar units, said wind rotor units and near to the ground, accessible for users and multiblock robots, are provided with one of said parts groups, consisting of said multiblock-articulated frames having inside said multiblock battery dispensers and said multiblock battery changers with optical battery charge indicators;

said socket flange booster chambers with said multiblock battery dispensers and said multiblock battery changers, are rotatable about the own center axis and are arranged one above the other;

said battery dispensers and battery changers are provided with said socket flange booster chambers with said integrated control computer units, with user accessible, integrated checkcard readers and checkcard activation, actuating comparison of user justification codes;

said battery units in empty state are returned to and plug connected on said battery dispensers and battery changers after said checkcard activation, actuating said locking solenoid switches and activating magnetic lockings inside of the rotation flange plug connections of said battery units and locking of the spring-loaded clamp levers, engaging plugs and plug sleeves of said rotation flange plug connections for the plug connection, separately and individually or of several jointly of said empty battery units, and for the delivery and withdrawal by the user of single, individually or several jointly of said battery units in recharged state, after checkcard activation, actuating said locking solenoid switches and activating said magnetic lockings and unlocking said spring loaded clamp levers, said engaging plugs and said plug sleeves of said[]rotation flange plug connections;

said parts groups in said combinations are separately and individually everywhere installed and in a plurality of said combinations, on road borders, parking places, petrol stations at the disposition for electro cars and self operating robots.

5. The multiblock robot system of claim 1 wherein said multiblock battery dispensers and additionally, self operating battery changers are installed in a distant position to said multiblock energy stations with connection between said energy station, said battery dispensers, said battery changers and the public mains, accomplished by said horizontal junction socket flange booster chambers with said rotation flange plug connections, placed below the ground;

said battery changer for self operating battery exchange of multiblock robots as also for multiblock electro cars, comprises on the left and on the right side of said socket flange booster chambers with vertical support function and with said plug connected multiblock standard parts, two of said battery lines which are rotatable about the horizontal axis and additionally rotatable about the horizontal axis, whereas each of said individual battery lines is moreover alone rotatable about the own vertical axis;

the identical combinations of said socket flange booster chambers with integrated battery units compose said battery lines, with said integrated control computer unit, integrated checkcard reader and checkcard activation, integrated antenna and remote control units, integrated movement, image recognition and infrared control sensors, also provided as compatible equipment for multiblock robots and multiblock electrocars for the self operating battery exchange, said self operating battery exchange of said multiblock robots and said multiblock electro cars is achieved by a robot battery-exchange control program, with the initial release of said checkcard activation, guide surveillance and precise positioning provided by movement sensors and telecomands of remote control units, for driving in straight direction to said rotation flange plug connections of the aligned, said battery lines and for driving backwards from said battery lines;

said self operating battery exchange of said multiblock robots and said multiblock electro cars is further achieved by the self operating rotation of said battery line of said self operating battery changer for the reception and plug connection of separate or several of said battery units in order to be recharged and by a further rotation of said battery lines, being accomplished for the delivery of said battery units separately or of several of said battery units jointly, which are fully recharged and by the locking and unlocking of said battery units, separately or several of said battery units jointly, being achieved by said locking solenoid switches and magnetic lockings of said rotation flange plug connections inside of each of said battery units;

said multiblock robots and said multiblock electro cars are only released for the continuation of operations when receiving control impulses from control computer unit of said self operating battery changer, indicating that the battery exchange has been successfully terminated, with additional optical and acoustical indication inside of said electro cars.

6. The multiblock robot system of claim 1 wherein the head of masts of foreign reinforced concrete or steel masts receives one of said rotation flange plug connections for a connection abutment function for one of said multiblock standard parts with said rotation flange plug connections in horizontal and vertical direction, and inside of said masts being provided with current and communication channels, leading up to the bottom of said masts for connection with the public mains;

said multiblock standard part in the masts head position is plug connected with said combinations of multiblock solar, wind and battery part groups, multiblock-articulated frames, and further of said multiblock standard parts for system assistance;

said combinations are plug connected on said rotation flange plug connection in head positions and are self operating, freely rotatable about masts axis and are guided laterally on the mast, near to the ground, by said socket flange booster chambers with integrated rotation support rollers;

said masts are transformed to stationary energy stations, supplying generated current to the public mains, to the distantly positioned multiblock battery dispensers and battery changers.

* * * * *